United States Patent
Strand et al.

(10) Patent No.: US 12,240,769 B2
(45) Date of Patent: Mar. 4, 2025

(54) CLEANING ARRANGEMENT FOR A LIQUID TREATMENT SYSTEM

(71) Applicant: Wallenius Water Innovation AB, Stockholm (SE)

(72) Inventors: Staffan Strand, Stockholm (SE); Johan Bergqvist, Saltsjo-Boo (SE)

(73) Assignee: Wallenius Water Innovation AB, Stockholm (SE)

( * ) Notice: Subject to any disclaimer, the term of this patent is extended or adjusted under 35 U.S.C. 154(b) by 342 days.

(21) Appl. No.: 17/790,855

(22) PCT Filed: Jan. 18, 2021

(86) PCT No.: PCT/SE2021/050023
§ 371 (c)(1),
(2) Date: Jul. 5, 2022

(87) PCT Pub. No.: WO2021/158156
PCT Pub. Date: Aug. 12, 2021

(65) Prior Publication Data
US 2023/0025794 A1      Jan. 26, 2023

(30) Foreign Application Priority Data

Feb. 6, 2020   (SE) .................... 2050120-1

(51) Int. Cl.
*C02F 1/32*   (2023.01)
(52) U.S. Cl.
CPC ...... *C02F 1/325* (2013.01); *C02F 2201/3223* (2013.01); *C02F 2201/324* (2013.01)
(58) Field of Classification Search
CPC .............. C02F 1/325; C02F 2201/3223; C02F 2201/324; C02F 2303/22; C02F 1/32
See application file for complete search history.

(56) References Cited

U.S. PATENT DOCUMENTS

| 5,227,140 A | 7/1993 | Hager et al. |
| 5,528,044 A | 6/1996 | Hutchison |

(Continued)

FOREIGN PATENT DOCUMENTS

| EP | 0785907 A1 | 7/1997 |
| EP | 1371611 A1 | 12/2003 |

(Continued)

OTHER PUBLICATIONS

Extended European Search Report dated Aug. 31, 2023 issued in corresponding European Patent Application No. 21751353.0.

(Continued)

*Primary Examiner* — David E Smith
*Assistant Examiner* — Christopher J Gassen
(74) *Attorney, Agent, or Firm* — Harness, Dickey & Pierce, P.L.C.

(57) ABSTRACT

A liquid treatment system and a cleaning arrangement, wherein said liquid treatment system comprises at least one ultra-violet (UV) light treatment lamp arranged within an elongated protective UV-transparent sleeve provided along a central longitudinal axis A, said sleeve having an outer surface and an essentially circular cross-sectional shape; and a reactor configured to receive said sleeve, whereby a liquid treatment chamber for receiving liquid to be treated, is provided between an inner surface of the reactor and the outer surface of the sleeve; wherein said liquid treatment system further comprises at least one cleaning arrangement comprising at least one coil spring, which is wrapped around at least a part of a circumference of the sleeve such that a spring force of the at least one coil spring will press the coil spring towards the sleeve, wherein said cleaning arrangement is configured to be moved along the sleeve and the coil spring will clean the outer surface of the sleeve, wherein said cleaning arrangement comprises at least two coil springs (Continued)

which are mounted in a holder of the cleaning arrangement such that the coil springs together wrap over essentially the whole circumference of the sleeve.

10 Claims, 5 Drawing Sheets

(56) References Cited

U.S. PATENT DOCUMENTS

| | | | |
|---|---|---|---|
| 5,858,740 | A | 1/1999 | Finer et al. |
| 5,874,740 | A | 2/1999 | Ishiyama |
| 5,937,266 | A | 8/1999 | Kadoya |
| 7,159,264 | B2 | 1/2007 | Sotirakos et al. |
| RE39,522 | E | 3/2007 | Ishiyama |
| 8,525,126 | B2 | 9/2013 | Lee et al. |
| 2006/0231770 | A1 | 10/2006 | Snowball |
| 2015/0335911 | A1* | 11/2015 | Rogers ............... A61N 5/0616 607/88 |

FOREIGN PATENT DOCUMENTS

| | | |
|---|---|---|
| EP | 1714944 A1 | 10/2006 |
| GB | 2389577 A | 12/2003 |
| KR | 20080084042 A | 9/2008 |
| WO | WO-2017192080 A1 | 11/2017 |
| WO | WO-2018/151659 A1 | 8/2018 |

OTHER PUBLICATIONS

International Search Report and Written Opinion for International Application No. PCT/SE2021/050023 dated Apr. 1, 2021.

\* cited by examiner

CLEANING ARRANGEMENT FOR A LIQUID TREATMENT SYSTEM

CROSS-REFERENCE TO RELATED APPLICATIONS

This application is a national phase under 35 U.S.C. § 371 of PCT International Application No. PCT/SE2021/050023 which has an International filing date of Jan. 18, 2021, which claims priority to Swedish Application No. 2050120-1, filed Feb. 6, 2020, the entire contents of each of which are hereby incorporated by reference.

TECHNICAL FIELD OF THE INVENTION

The present invention relates to a cleaning arrangement for a liquid treatment system comprising at least one ultraviolet (UV) light treatment lamp and to a liquid treatment system comprising at least one cleaning arrangement.

RELATED ART

There are many applications where UV light sources are used for treating liquids. Wallenius Water AB in Sweden has developed and is selling liquid treatment equipment comprising an elongated tubular treatment chamber with an inlet and an outlet. In the treatment chamber at least one generally tubular protective UV transparent sleeve (e.g. made from fused quartz) is arranged and inside the sleeve is a UV light source arranged, such as a lamp capable of generating wavelengths in the UV region.

Another type of treatment reactor developed by the applicant also comprises a treatment chamber having oppositely arranged in- and outlets, where the UV light sources are arranged in elongated sleeves, e.g. fused quartz sleeves. These sleeves are arranged perpendicular to the flow of liquid to be treated through the treatment chamber.

The above described treatment units are functioning very well for treating all sorts of liquids for example water, where the latter described treatment unit is specially adapted for treatment of ballast water in ships. The liquid that is treated often comprises particles and other solid matter other than the organisms that are killed off by the treatment units. These particles, as well as other residue from the killed off organisms, have a tendency to stick on the interior surfaces of treatment units. These particles, and other residue, aggregated on the surface are generally denoted as fouling.

UV light treatment, more specifically UV-light in combination with heat, sometimes provokes chemical reactions resulting in depositions on the interior surfaces. These resulting depositions are generally denoted as scaling.

Often scaling is more difficult to remove from the surface than fouling.

This means that in order to have an optimum efficiency of the treatment device the interior has to be cleaned regularly. According to one solution in the prior art cleaning is performed by injecting cleaning liquids into the treatment chamber, where the cleaning liquids are developed for removing the fouling or scaling on the surfaces. However, even if they are efficient for removing fouling/scaling and the like deposits on the surfaces of the treatment chambers, they require that the treatment units are closed down during a period of time, whereby thus no treatment of liquid may be performed.

According to other suggestions, various forms of wiper mechanisms have been designed to remove fouling/scaling from surfaces. All such forms of wiper mechanisms act to "wipe off" the layer from the external surface of the sleeve. Such wiper mechanisms often require a large annular space between the outside surface of the sleeve housing the UV lamp and the surrounding tubing housing the sleeve in order to accommodate the wiper mechanism. The treatment system relies on the transmittance of the liquid in order to allow the UV photons to reach the contaminants in the liquid passing through the annular region between the sleeve and housing.

Some patents and patent applications within the technical field will now be briefly discussed in the following.

EP1371611 relates to a fluid treatment apparatus. A cleaning assembly comprising a plurality of cleaning heads is provided. The cleaning heads each comprise a plurality of portions of titanium dioxide which are biased against the surface of the respective UV lamps.

U.S. Pat. No. 5,227,140 relates to a modular self-cleaning oxidation chamber comprising a shuttling scraper including an annular wiper that simultaneously cleans the inside surface of the surrounding tubular module as well as the outside surface of an enclosed quartz tube. The wiper is driven by the liquid and has the form of an annular disk and being composed of a fluoroelstomer.

EP1714944 relates to a fluid disinfection apparatus of a kind similar to the apparatus of EP1371611. A cleaning material may be a fabric or metal, e.g. a metal gauze covered by titanium dioxide and may be biased into contact with the ultra-violet light source.

U.S. Pat. No. 7,159,264 discloses a scraper for cleaning tubular members. The scraper comprises a plurality of concatenated resilient segments adapted to contact the exterior surface of the tubular member. The resilient member is made up from a resilient wire. The cleaning effect of the tubular member is achieved when the scraper is moved axially with regard to the tubular member.

USRE39522 relates to ultraviolet ray irradiation equipment having scraper rings fitted to light transmission tubes. The scraper ring defines a cleaning solution chamber to be in contact with the outer surface of a tube. The scraper may be made from a non-elastic material such as Teflon® and stainless steel. The frequency of cleaning is determined upon the quantity of scale and is exemplified as two to three times a day.

U.S. Pat. No. 5,937,266 relates to a light irradiating device equipped with a cleaning mechanism. The mechanism comprises scrapers adapted to slide along the outside surface of the light-transmitting tubes. The material used for the scraper may rubber or Teflon®, or a cleaning cloth.

EP0785907 relates to a shuttling scraper including a wiper cartridge, configured to clean the outside surface of a quartz tube. The cartridge may be filled with a scrubber material which may consist of stainless steel turnings or stainless steel wool. When the shuttling scraper is in a parked position the wiper cartridge is protected from UV radiation and the heat of the UV lamp, which also helps to extend the life of the wiper cartridge.

KR20080084042 describes an ultraviolet disinfection apparatus with a cleaning frame and a ring-shaped wiper for cleaning surfaces of sleeves.

The above prior art documents disclose various UV-light treatment apparatuses that include mechanical cleaning members provided with various materials for removing fouling/scaling from a UV-lamp surface.

Despite the various solutions suggested in the above prior art some drawbacks still remain in particular with regard to remove harder material, i.e. scaling, from the outer surface of the UV-transparent sleeve enclosing the UV-lamp.

SUMMARY

It is an object of the invention to provide an improved cleaning arrangement for a liquid treatment system which is capable of efficiently removing harder material from the outer surface of the sleeve.

This is achieved in a liquid treatment system and in a cleaning arrangement according to the independent claims.

According to one aspect of the invention a liquid treatment system is provided which comprises:
- at least one ultra-violet (UV) light treatment lamp arranged within an elongated protective UV-transparent sleeve provided along a central longitudinal axis A, said sleeve having an outer surface and an essentially circular cross-sectional shape; and
- a reactor configured to receive said sleeve, whereby a liquid treatment chamber for receiving liquid to be treated, is provided between an inner surface of the reactor and the outer surface of the sleeve; wherein said liquid treatment system further comprises
- at least one cleaning arrangement comprising at least one coil spring, which is wrapped around at least a part of a circumference of the sleeve such that a spring force of the at least one coil spring will press the coil spring towards the sleeve, wherein said cleaning arrangement is configured to be moved along the sleeve and the coil spring will clean the outer surface of the sleeve,
- wherein said cleaning arrangement (17; 117) comprises at least two coil springs (19; 119; 219) which are mounted in a holder (23; 123; 223) of the cleaning arrangement such that the coil springs together wrap over essentially the whole circumference of the sleeve,
- wherein said holder (23) of the cleaning arrangement (17) comprises a first ring shaped coil spring attachment part (31a) and a second ring shaped coil spring attachment part (31b) which are connected to each other such that they are provided at a distance from each other along the sleeve (8), wherein the first and second coil spring attachment parts (31a, 31b) are configured to encircle the sleeve (8) and be movable along the sleeve and wherein a first end (19a) of each coil spring (19) of the cleaning arrangement (17) is attached to the first coil spring attachment part (31a) and a second end (19b) of each coil spring (19) is attached to the second coil spring attachment part (31b) such that each coil spring (19) will wrap around a part of the circumference of the sleeve (8).

According to another aspect of the invention a cleaning arrangement is provided which is configured to be used in a liquid treatment system, where said liquid treatment system comprises at least one ultra-violet (UV) light treatment lamp arranged within an elongated protective UV-transparent sleeve provided along a central longitudinal axis A, said sleeve having an outer surface and an essentially circular cross-sectional shape and a reactor configured to receive said sleeve, whereby a liquid treatment chamber for receiving liquid to be treated, is provided between an inner surface of the reactor and the outer surface of the sleeve, wherein said cleaning arrangement comprises:
- at least one coil spring, which is provided in the cleaning arrangement such that it will be wrapped around at least a part of a circumference of a sleeve of a liquid treatment system when the cleaning arrangement is provided in a liquid treatment system and such that a spring force of the at least one coil spring will press the coil spring towards the sleeve, wherein said cleaning arrangement is configured to be moved along the sleeve and the coil spring will clean the outer surface of the sleeve,
- wherein said cleaning arrangement (17; 117) comprises at least two coil springs (19; 119; 219) which are mounted in a holder (23; 123; 223) of the cleaning arrangement such that the coil springs together wrap over essentially the whole circumference of a sleeve of a liquid treatment system (2) when the cleaning arrangement (17; 117) is provided in a liquid treatment system (2),
- wherein said holder (23) of the cleaning arrangement (17) comprises a first ring shaped coil spring attachment part (31a) and a second ring shaped coil spring attachment part (31b) which are connected to each other such that they are provided at a distance from each other, wherein the first and second coil spring attachment parts (31a, 31b) are configured to encircle a sleeve (8) of a liquid treatment system (2) when the cleaning arrangement (17) is provided in a liquid treatment system (2) and configured to be movable along the sleeve and wherein a first end (19a) of each coil spring (19) of the cleaning arrangement (17) is attached to the first coil spring attachment part (31a) and a second end (19b) of each coil spring (19) is attached to the second coil spring attachment part (31b) such that each coil spring (19) will wrap around a part of the circumference of the sleeve (8) when the cleaning arrangement (17) is provided in a liquid treatment system (2).

Hereby a cleaning arrangement for a liquid treatment system is achieved which effectively can remove scaling from an outer surface of the sleeve surrounding the UV-lamp. The spring force of the coil spring is utilized for applying a force towards the sleeve and hereby scaling can effectively be removed. A material of the coil spring can be chosen which is effective for removal of scaling, such as for example stainless steel. Coil springs are produced as standardized components with robust and precise performance in a wide range of materials. For example materials with extreme resistance to corrosion are available and materials which are effective for the removal of scaling. The coil spring can transform large variations in a sleeve diameter to small variations in radial force and hereby the sleeve can be uniformly and effectively cleaned. The use of a flexible spring for the cleaning provides a cleaning arrangement which can adjust to different shapes, which is suitable when cleaning quartz sleeves which may have coarse tolerances regarding roundness and straightness. Materials and design of coil springs make them extremely durable and therefore highly reduces or even eliminates the need of service or replacement.

In one embodiment of the invention said cleaning arrangement comprises at least one coil spring which is provided over substantially the whole circumference of the sleeve when the cleaning arrangement is provided in a liquid treatment system, wherein the at least one coil spring is a garter spring or a coil spring which is bent to a circular shape.

In one embodiment of the invention the at least one coil spring is provided stretched wrapping around the sleeve such that the spring force of the at least one coil spring will press the coil spring towards the sleeve when the cleaning arrangement is provided in a liquid treatment system.

In one embodiment of the invention said cleaning arrangement further comprises a ring shaped holder provided encircling the sleeve and movable along the sleeve, wherein said holder is enclosing an outer surface of the at least one coil spring.

In one embodiment of the invention the coil spring is a canted coil spring or a rectangular coil spring.

In one embodiment of the invention the at least one coil spring is made from stainless steel or a nickel alloy.

BRIEF DESCRIPTION OF THE DRAWINGS

FIG. 3c is a perspective view of a cleaning arrangement according to one embodiment of the invention which cleaning arrangement comprises the coil spring as shown in FIG. 3a.

FIG. 4b is a perspective view of a cleaning arrangement according to one embodiment of the invention which cleaning arrangement comprises the coil spring as shown in FIG. 4a.

DETAILED DESCRIPTION OF EMBODIMENTS

Figure 1:
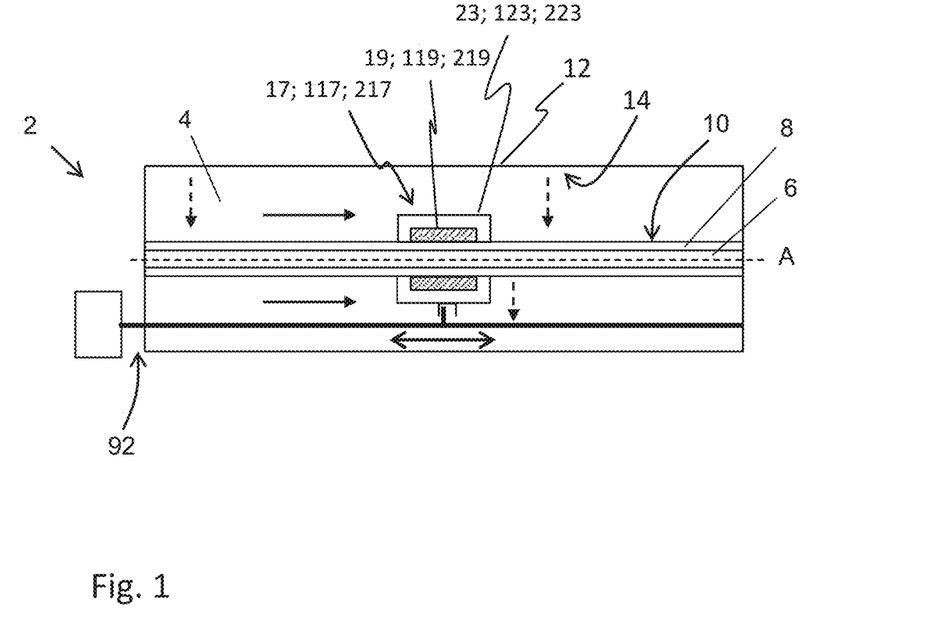
FIG. 1 is a schematic view of a liquid treatment system according to the invention.

FIG. 1 is a schematic view in cross section of a liquid treatment system 2 with a UV light source 6 which can use a cleaning arrangement 17; 117; 217 according to the invention. There are in principle two different types of liquid treatment systems 2 which both can be provided with a cleaning arrangement 17; 117; 217 according to the invention. The difference between these two types is the direction of flow of the liquid to be treated in relation to the UV lamp 6. Either the liquid is flowed along the length of the UV lamp 6 or the liquid is flowed transverse to the one or more UV lamps 6. Both these types are illustrated in FIG. 1 by arrows showing the liquid flow. Solid line arrows show flow along the length of the UV lamp 6 and broken line arrows show a liquid flow transverse to the direction of the UV lamp 6. Inlet and outlet for a liquid to be provided into a treatment chamber 4 need to be provided accordingly, i.e. either in each end of the UV lamp or on opposite sides of the UV lamp. Inlets and outlets are however not shown in the schematic drawing of FIG. 1.

The liquid treatment system 2 comprises at least one ultra-violet UV light treatment lamp 6 arranged within an elongated protective UV-transparent sleeve 8 provided along a central longitudinal axis A. The sleeve 8 has an outer surface 10 and an essentially circular cross-sectional shape. The liquid treatment system 2 further comprises a reactor 12 configured to receive said sleeve 8, whereby a liquid treatment chamber 4 for receiving liquid to be treated, is provided between an inner surface 14 of the reactor 12 and the outer surface 10 of the sleeve 8. The liquid treatment system 2 comprises further at least one cleaning arrangement 17; 117; 217 which according to the invention comprises at least one coil spring 19; 119; 219. The cleaning arrangement 17; 117; 217 is configured to transfer the at least one coil spring 19; 119; 219 over the sleeve surface 10 for cleaning the outer surface 10 of the sleeve 8.

The cleaning arrangement 17; 117; 217 is configured to be moved by a driving arrangement 92 which is structured to drive the cleaning arrangement 17; 117; 217 in the treatment chamber 4 along said sleeve 8.

The cleaning arrangement 17; 117; 217 may comprise a holder 23; 123; 223 which at least partly has a general shape of a tubular body having an inner circular cross-sectional shape adapted to the outer diameter of said sleeve 8. Furthermore, the cleaning arrangement 17; 117; 217 has a length extending over only a part of the length of the sleeve 8, for example a part being less than a fifth or less than 5% of the length of the sleeve. The cleaning arrangement 17; 117; 217 is configured for being moved along the length of the sleeve 8 and will therefore clean the whole or essentially the whole outer surface of the sleeve.

Figure 2A:
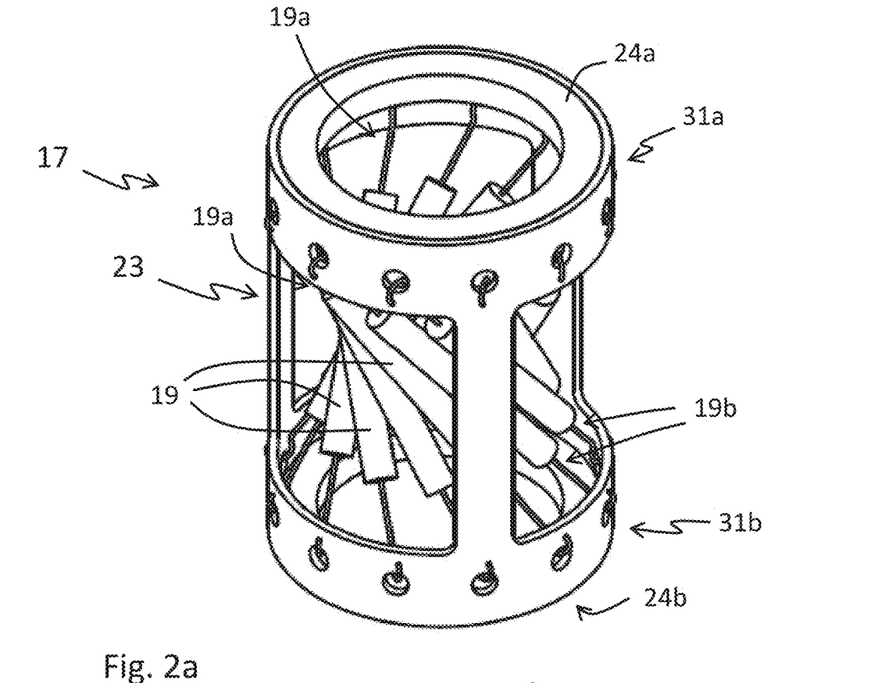
FIG. 2a is a perspective view of a cleaning arrangement according to one embodiment of the invention.
Figure 2B:
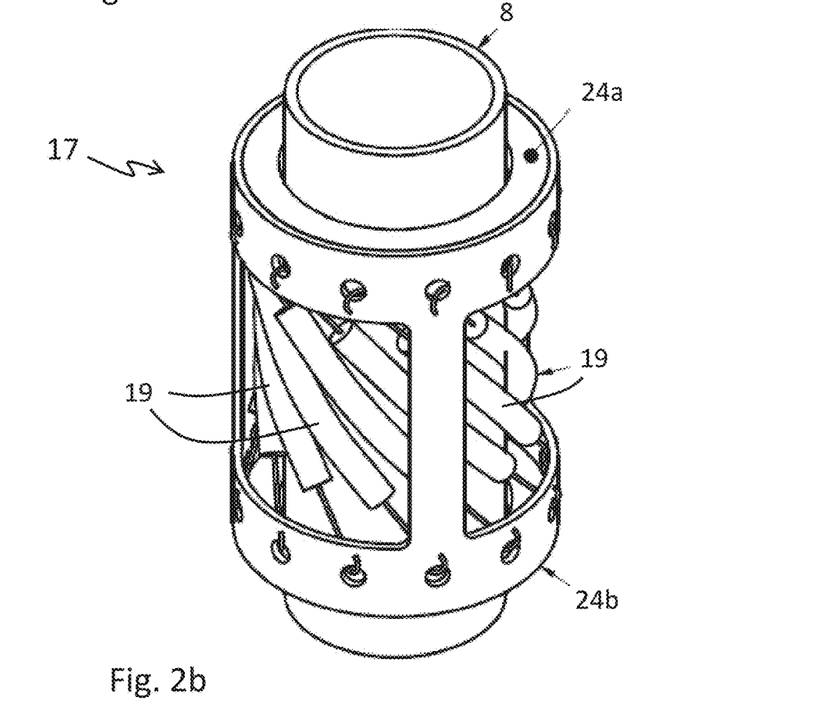
FIG. 2b is a perspective view of the cleaning arrangement as shown in FIG. 2a provided around a sleeve of a liquid treatment system.
Figure 3A:
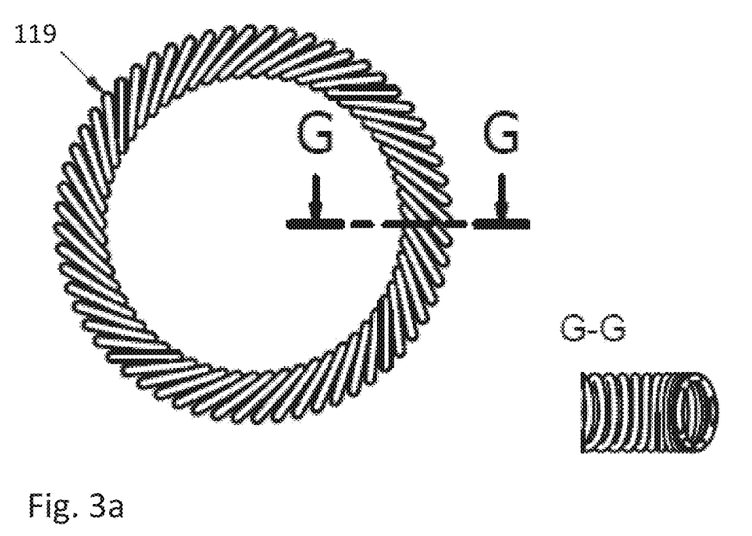
FIG. 3a shows a coil spring which can be used in a cleaning arrangement according to one embodiment of the invention.
Figure 3B:
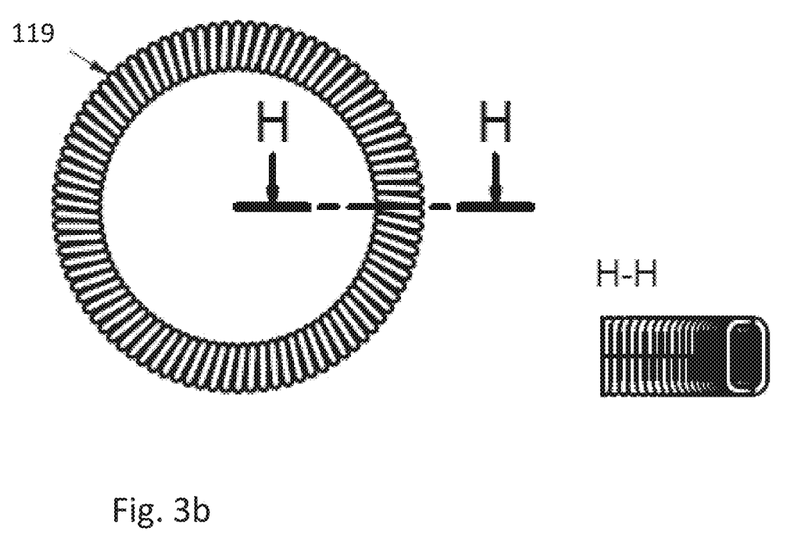
FIG. 3b shows another coil spring which can be used in a cleaning arrangement according to one embodiment of the invention.
Figure 3C:
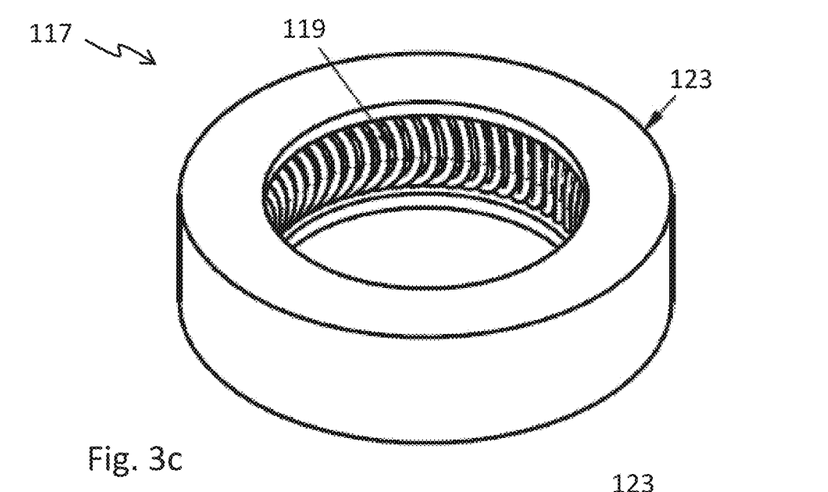
Figure 3D:
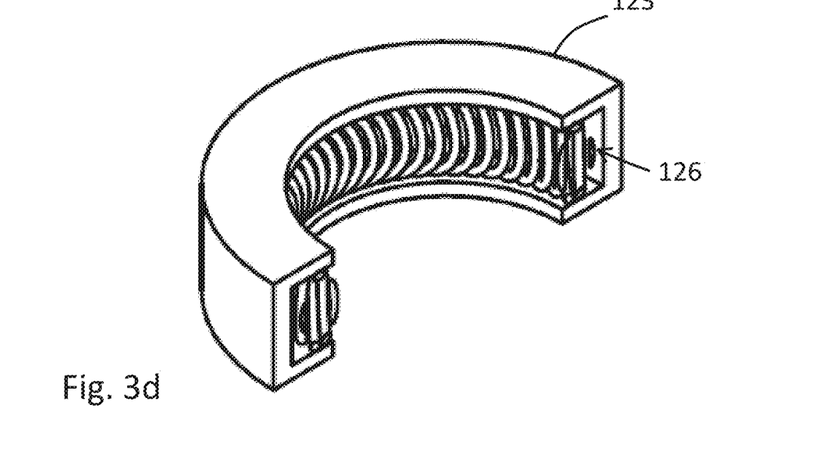
FIG. 3d is a cut through the cleaning arrangement as shown in FIG. 3c.
Figure 4A:
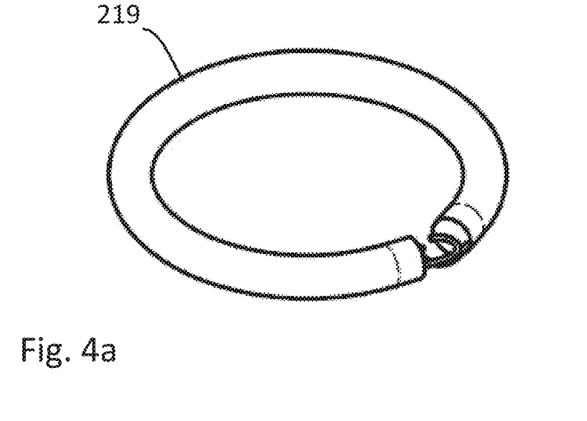
FIG. 4a shows a coil spring which can be used in a cleaning arrangement according to one embodiment of the invention.
Figure 4B:
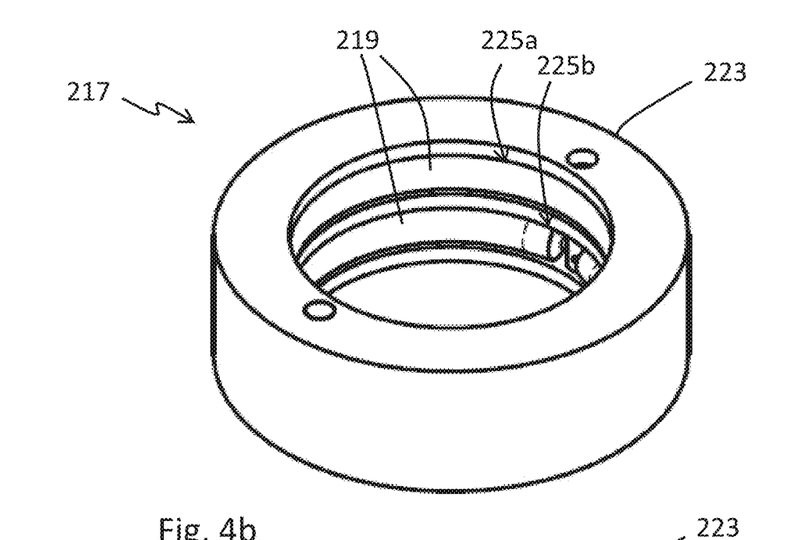
Figure 4C:
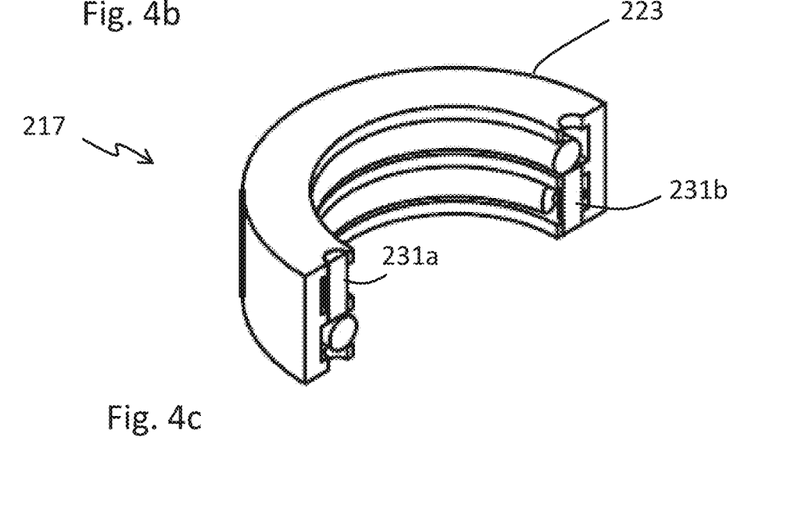
FIG. 4c is a cut through the cleaning arrangement as shown in FIG. 4b.

The invention relates to a cleaning arrangement 17; 117; 217 as shown in FIGS. 2, 3 and 4 and to a liquid treatment system 2 as shown in FIG. 1 comprising such a cleaning arrangement 17; 117; 217.

The cleaning arrangement 17; 117; 217 according to the invention is configured to be used in a liquid treatment system 2 as described in relation to FIG. 1. Said liquid treatment system 2 comprises at least one ultra-violet (UV) light treatment lamp 6 arranged within a protective UV-transparent sleeve 8 provided along a central longitudinal axis A, said sleeve 8 having an outer surface 10 and an essentially circular cross-sectional shape and a reactor 12 configured to receive said sleeve 8, whereby a liquid treatment chamber 4 for receiving liquid to be treated, is provided between an inner surface 14 of the reactor 12 and the outer surface 10 of the sleeve 8.

The cleaning arrangement 17; 117; 217 comprises at least one coil spring 19; 119; 219, which is provided in the cleaning arrangement 17; 117; 217 such that it will be wrapped around at least a part of a circumference of a sleeve 8 of a liquid treatment system 2 when the cleaning arrangement 17; 117; 217 is provided in a liquid treatment system 2 and such that a spring force of the at least one coil spring 19; 119; 219 will press the coil spring towards the sleeve 8, wherein said cleaning arrangement 17; 117; 217 is configured to be moved along the sleeve 8 and the at least one coil spring will hereby clean the outer surface 10 of the sleeve 8. Thanks to the spring force which is pressing the at least one coil spring towards the sleeve, scaling will effectively be removed from the sleeve when the cleaning arrangement is transferred along the sleeve. A material of the coil spring can be chosen which is effective for removal of scaling, such as for example stainless steel or a nickel alloy, such as for example Hastelloy C-276. Coil springs are produced as standardized components with robust and precise performance in a wide range of materials. For example, materials with extreme resistance to corrosion are available and materials which are effective for the removal of scaling.

A few different embodiments of the cleaning arrangement 17; 117; 217 are shown in FIGS. 2-4. Common is that one or more coil springs 19; 119; 219 are used as the cleaning element and that the spring force itself is used for providing a force of the cleaning element (coil spring) towards the sleeve 8. A holder 23; 123; 223 for the at least one coil spring is provided in some embodiments and the at least one coil spring 19; 119; 219 can be moved along the length of the sleeve for cleaning the whole sleeve by moving the holder.

FIG. 2*a* is a perspective view of a cleaning arrangement 17 according to one embodiment of the invention. FIG. 2*b* is a perspective view of the cleaning arrangement 17 as shown in FIG. 2*a* provided around a sleeve 8 of a liquid treatment system 2. The invention further relates to a liquid treatment system 2 comprising such a cleaning arrangement 17.

The cleaning arrangement 17 according to this embodiment of the invention comprises a number of coil springs 19 which are mounted in a holder 23 of the cleaning arrangement 17 such that the coil springs 19 together wrap over essentially the whole circumference of the sleeve. The number of coil springs can be two or more, such as for example at least 4 coil springs, at least 5 coil springs or at least 6 coil springs 19. Said holder 23 of the cleaning arrangement 17 comprises in this embodiment of the invention a first ring shaped coil spring attachment part 31*a* and a second ring shaped coil spring attachment part 31*b* which are connected to each other such that they are provided at a distance from each other along the sleeve 8 when the cleaning arrangement 17 is provided in a liquid treatment system 2. The first and second coil spring attachment parts 31*a*, 31*b* are configured to encircle the sleeve 8 and be movable along the sleeve when the cleaning arrangement 17 is provided in a liquid treatment system 2. A first end 19*a* of each coil spring 19 of the cleaning arrangement 17 is attached to the first coil spring attachment part 31*a* and a second end 19*b* of each coil spring 19 is attached to the second coil spring attachment part 31*b* such that each coil spring 19 will wrap around a part of the circumference of the sleeve 8, i.e. the coil springs are not connected the shortest way between the first and second coil spring attachment parts 31*a*, 31*b* but instead mounted diagonally in a rotational pattern in the holder 23. The coil springs 19 can in some embodiment be slightly stretched when mounted in the holder 23 which will provide a pressing force from the coil springs 19 towards the sleeve 8 when the cleaning arrangement 17 is provided sliding over the sleeve 8 in a liquid treatment system 2. Furthermore, the diagonal mounting of the coil springs within the holder 23 will provide a hyperboloid shape of the coil springs 19 when not used in a liquid treatment system 2. When the cleaning arrangement 17 is slid over the sleeve 8 of the liquid treatment system 2 the hyperboloid shape will transform into a more cylindrical shape and the coil springs 19 will be stretched and hereby provide a force towards the sleeve 8 even if they were not stretched when mounted. The hyperboloid shape will facilitate the entrance of a sleeve and will also help in centring the sleeve in the cleaning arrangement. The coil springs 19 will each wrap around a part of a circumference of the sleeve 8 when the cleaning arrangement 17 is used in a liquid treatment system 2. Together the coil springs 19 will wrap around the whole circumference of the sleeve 8 and hereby clean the sleeve around the whole circumference. As discussed above, the cleaning arrangement 17 is configured to be moved along the sleeve 8 by a driving arrangement 92 as shown in FIG. 1 and hereby the whole sleeve 8 can be cleaned effectively.

The cleaning arrangement 17 can furthermore in some embodiments be provided with two bushings 24*a*, 24*b* mounted one to each end of the holder 23, i.e. one in the end of the holder 23 where the first coil spring attachment part 31*a* is provided and one in the opposite end where the second coil spring attachment part 31*b* is provided. The bushings 24*a*, 24*b* prevent the coil springs 19 to be squeezed between the sleeve 8 and holder 23.

The coil springs 19 used in the cleaning arrangement 17 can be ordinary cylindrical coil springs or canted coil springs or rectangular coil springs. The use of canted or rectangular coil springs may reduce a risk of rotation of the springs when sliding along the sleeve 8. Prevention of rotation may improve cleaning efficiency.

In some other embodiments of the invention said cleaning arrangement 117; 217 comprises at least one coil spring 119; 219 which is provided over substantially the whole circumference of the sleeve 8, wherein the at least one coil spring is a garter spring 119 or a coil spring 219 which is bent to a circular shape.

In some embodiments the at least one coil spring 119; 219 is provided stretched wrapping around the sleeve such that the spring force of the at least one coil spring 119; 219 will press the coil spring towards the sleeve 8.

In some embodiments said cleaning arrangement 117; 217 further comprises a ring shaped holder 123; 223 provided encircling the sleeve and movable along the sleeve, wherein said holder is enclosing an outer surface of the at least one coil spring 119; 219.

These embodiments are described below with reference to FIGS. 3 and 4.

FIGS. 3*a* and 3*b* show two different types of coil springs 119 which can be used in a cleaning arrangement 117 according to one embodiment of the invention. FIG. 3*c* is a perspective view of a cleaning arrangement 117 according to one embodiment of the invention which cleaning arrangement comprises the coil spring 119 as shown in FIG. 3*a*.

FIG. 3*d* is a cut through the cleaning arrangement 117 as shown in FIG. 3*c*.

The coil springs 119 as shown in FIGS. 3*a* and 3*b* could as well, in another embodiment of the invention, be used as cleaning arrangement on its own, i.e. without a holder 123 as shown in FIG. 3*c*.

The cleaning arrangement 117 according to this embodiment of the invention comprises at least one coil spring 119 which is provided over substantially the whole circumference of the sleeve 8 when the cleaning arrangement is provided in a liquid treatment system 2. The at least one coil spring 119 can be a garter spring 119 as shown in FIGS. 3*a*-3*d* but can also be a coil spring 219 which is bent to a circular shape which is shown in FIGS. 4*a*-*b*. The garter spring 119 can for example be a canted garter spring as shown in FIG. 3*a* or a rectangular garter spring as shown in FIG. 3*b*. The canted shape and the rectangular shape of these garter springs 119 will prevent the springs from rotating when sliding along the sleeve 8. Prevention of rotation will improve cleaning efficiency.

The at least one coil spring (garter spring 119 in FIGS. 3 and bent coil spring 219 in FIGS. 4) is provided stretched wrapping around the sleeve 8 of the liquid treatment system 2 when the cleaning arrangement 117, 217 is provided in a liquid treatment system 2 such that the spring force of the at least one coil spring 119; 219 will press the coil spring towards the sleeve 8. Hereby a conform force is provided from the coil spring over the circumference of the sleeve 8.

The cleaning arrangement 117 as shown in FIG. 3*c* further comprises a ring shaped holder 123 which is provided for encircling the sleeve 8 and to be movable along the sleeve 8 when the cleaning arrangement 117 is provided in a liquid treatment system 2. Said holder 123 is enclosing an outer surface of the at least one coil spring 119. An inner surface of the coil spring 119 is abutting against the sleeve 8. The ring shaped holder 123 is not provided for pressing the coil spring towards the outer surface 10 of the sleeve 8. There may instead be a free space 126 between the outer surface of the at least one coil spring 119 and the ring shaped holder 123. If the holder would not allow the spring to be free floating, large forces from the spring towards the sleeve could be a problem due to course tolerances of the sleeve and the stiffness of compressing a coil spring radially. The holder is mainly provided for allowing an axial force to be transferred to the coil spring 119 for moving the coil spring along the length of the sleeve 8 and thereby clean the outer surface 10 of the sleeve 8 by the action of the coil spring 119 towards the outer surface.

FIG. 4a shows a coil spring 219 which can be used in a cleaning arrangement 217 according to another embodiment of the invention. FIG. 4b is a perspective view of a cleaning arrangement 217 according to one embodiment of the invention which cleaning arrangement 217 comprises the coil spring 219 as shown in FIG. 4a. FIG. 4c is a cut through the cleaning arrangement as shown in FIG. 4b.

The cleaning arrangement 217 as shown in FIG. 4b comprises two coil springs 219 as shown in FIG. 4a. This coil spring 219 has been bent to a circular shape. The cleaning arrangement 217 of this embodiment comprises a ring shaped holder 223 which holds two coil springs 219. The holder 223 comprises two internal grooves 225a, 225b for holding the two coil springs 219. The number of coil springs 219 and internal grooves could however also be another than two. Also in this embodiment the coil springs 219 are slightly stretched to be slid over the sleeve 8 when the cleaning arrangement 217 should be used in a liquid treatment system 2. The holder 223 is only holding the coil springs 219 in correct relative position and allows transferring of an axial movement to the coil springs 219 for cleaning the whole length of the sleeve 8. In this embodiment two pins 231a, 231b are used for preventing rotation of the coil springs 219. The pins 231a, 231b are provided in the holder 223 and are protruding into the coil spring ends 219 for keeping them in the same position in relation to the holder 223. The pins 231a, 231b can also be called rotation stop member 231a, 231b and can be provided in the holder for preventing rotation of the coil springs.

The invention claimed is:

1. A liquid treatment system comprising:
at least one ultra-violet (UV) light treatment lamp arranged within an elongated protective UV-transparent sleeve provided along a central longitudinal axis A, the sleeve having an outer surface and an essentially circular cross-sectional shape;
a reactor configured to receive the sleeve, whereby the reactor and the sleeve together at least partially define a liquid treatment chamber for receiving liquid to be treated, the liquid treatment chamber at least partially defined between an inner surface of the reactor and the outer surface of the sleeve; and
at least one cleaning arrangement including at least two coil springs and a holder, each coil spring of the at least two coil springs configured to be wrapped around at least a respective part of a circumference of the sleeve such that a respective spring force of each respective coil spring of the at least two coil springs presses the respective coil spring towards the sleeve, wherein the cleaning arrangement is configured to be moved along the sleeve such that the at least two coil springs clean the outer surface of the sleeve,
wherein the at least two coil springs are mounted in the holder of the cleaning arrangement such that the at least two coil springs together wrap over essentially an entirety of the circumference of the sleeve,
wherein the holder of the cleaning arrangement includes a first ring shaped coil spring attachment part and a second ring shaped coil spring attachment part, the first and second ring shaped coil spring attachment parts connected to each other such that the first and second ring shaped coil spring attachment parts are provided at a distance from each other along the sleeve, wherein the first and second ring shaped coil spring attachment parts are configured to encircle the sleeve and to be movable along the sleeve,
wherein a first end of each coil spring of the at least two coil springs is attached to the first ring shaped coil spring attachment part and a second end of each coil spring of the at least two coil springs is attached to the second ring shaped coil spring attachment part to configure the at least two coil springs to wrap around respective parts of the circumference of the sleeve,
wherein the at least two coil springs are not connected a shortest distance between the first and second coil ring shaped spring attachment parts, and
wherein the at least two coil springs are mounted diagonally in a rotational pattern in the holder.

2. The liquid treatment system according to claim 1, wherein the at least two coil springs are canted coil springs or rectangular coil springs.

3. The liquid treatment system according to claim 1, wherein the at least two coil springs are made from stainless steel or a nickel alloy.

4. The liquid treatment system according to claim 1, wherein the cleaning arrangement comprises at least four coil springs, at least five coil springs, or at least six coil springs.

5. The liquid treatment system according to claim 1, wherein the at least two coil springs are configured to be stretched based on being mounted in the holder.

6. The cleaning arrangement according to claim 1, wherein the coil springs are stretched when mounted in the holder.

7. A cleaning arrangement configured to be used in a liquid treatment system, the liquid treatment system including at least one ultra-violet (UV) light treatment lamp arranged within an elongated protective UV-transparent sleeve provided along a central longitudinal axis A, the sleeve having an outer surface and an essentially circular cross-sectional shape, the liquid treatment system further including a reactor configured to receive the sleeve, the reactor and the sleeve together at least partially defining a liquid treatment chamber for receiving liquid to be treated, the liquid treatment chamber at least partially defined between an inner surface of the reactor and the outer surface of the sleeve, the cleaning arrangement comprising:
at least two coil springs, each coil spring of the at least two coil springs configured to be wrapped around at least a respective part of a circumference of the sleeve of the liquid treatment system based on the cleaning arrangement being provided in the liquid treatment system such that a respective spring force of each respective coil spring of the at least two coil springs presses the respective coil spring towards the sleeve, wherein the cleaning arrangement is configured to be moved along the sleeve such that the at least two coil springs clean the outer surface of the sleeve; and
a holder, wherein the at least two coil springs are mounted in the holder such that the at least two coil springs are configured to together wrap over essentially an entirety of the circumference of the sleeve of the liquid treatment system based on the cleaning arrangement being provided in the liquid treatment system, wherein the holder includes a first ring shaped coil spring attachment part and a second ring shaped coil spring attachment part, the first and second ring shaped coil spring attachment parts connected to each other such that the first and second ring shaped coil spring attachment parts are provided at a distance from each other, wherein the first and second ring shaped coil spring attachment parts are configured to encircle the sleeve of the liquid treatment system based on the cleaning arrangement being provided in the liquid treatment system and configured to be movable along the sleeve, wherein a first end of each coil spring of the at least two coil springs of the cleaning arrangement is attached to the first ring shaped coil spring attachment part and a second end of each coil spring of the at least two coil springs is attached to the second ring shaped coil spring attachment part to configure the at least two coil springs to wrap around respective parts of the circumference of the sleeve based on the cleaning arrangement being provided in the liquid treatment system, wherein the at least two coil springs are not connected a shortest distance between the first and second coil ring shaped spring attachment parts, and wherein the at least two coil springs are mounted diagonally in a rotational pattern in the holder.

8. The cleaning arrangement according to claim 7, wherein the at least two coil springs are canted coil springs or rectangular coil springs.

9. The cleaning arrangement according to claim 7, wherein the at least two coil springs are made from stainless steel or a nickel alloy.

10. The cleaning arrangement according to claim 7, wherein said the cleaning arrangement comprises at least four coil springs, at least five coil springs, or at least six coil springs.

* * * * *